United States Patent
Inoue

(10) Patent No.: US 8,200,735 B2
(45) Date of Patent: Jun. 12, 2012

(54) MULTI-CORE PROCESSOR FOR PERFORMING MATRIX OPERATIONS

(75) Inventor: Hiroshi Inoue, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1232 days.

(21) Appl. No.: 11/945,328

(22) Filed: Nov. 27, 2007

(65) Prior Publication Data

US 2008/0183792 A1 Jul. 31, 2008

(30) Foreign Application Priority Data

Jan. 25, 2007 (JP) .................................. 2007-14943

(51) Int. Cl.
*G06F 7/52* (2006.01)
(52) U.S. Cl. ..................................................... 708/607
(58) Field of Classification Search .................. 708/446, 708/520, 607
See application file for complete search history.

(56) References Cited

U.S. PATENT DOCUMENTS

| | | | | |
|---|---|---|---|---|
| 5,136,538 A | * | 8/1992 | Karmarkar et al. | 708/607 |
| 5,206,822 A | * | 4/1993 | Taylor | 708/607 |
| 5,267,185 A | * | 11/1993 | Akabane et al. | 708/520 |
| 5,905,666 A | * | 5/1999 | Hoffman et al. | 700/99 |
| 6,243,734 B1 | * | 6/2001 | Doshi et al. | 708/607 |
| 6,636,828 B1 | * | 10/2003 | Hachiya | 703/2 |
| 2006/0064452 A1 | * | 3/2006 | Nakanishi | 708/607 |

OTHER PUBLICATIONS

Wikipedia: 'Conjugate gradient method' (last modified Aug. 30, 2007).

* cited by examiner

*Primary Examiner* — Chuong D Ngo
(74) *Attorney, Agent, or Firm* — Yudell Isidore Ng Russell PLLC

(57) ABSTRACT

A data processing system for performing a matrix calculation is disclosed. The data processing system includes a multi-core processor with multiple processing elements each having a processor and a local memory. The data processing system includes a system memory, a first and second readout units, a first and second arithmetic unit, and an output unit.

10 Claims, 11 Drawing Sheets

(a)

30

1: FOR i = 1, M
2:   y(i) = 0.0
3:   LOAD(col(i, *)); LOAD(val(i, *)) //SYSTEM MEMORY
4:   FOR j = 1, NZ
5:     y(i) = y(i) + x(col(i, j)) * val(i, j)
6:   END FOR
7: END FOR (b)

30

1: FOR i = 1, M
2:   LOAD(y(i))   //FIRST LOCAL MEMORY
3:   LOAD(col(i, *)); LOAD(val(i, *) //FIRST LOCAL MEMORY
4:   FOR j = 1, NZ
5:     y(i) = y(i) + x(col(i, j) * val(i, j)
6:   END FOR
7:   STORE(y(i))
8: END FOR

MULTI-CORE PROCESSOR FOR PERFORMING MATRIX OPERATIONS

PRIORITY CLAIM

The present application claims benefit of priority under 35 U.S.C. §§119(a)-(d) or (f) to the previously filed Japanese Patent Application No. JP2007-14943 entitled, "System for performing arithmetic operations using a multi-core processor and method and program for the same" with a priority date of Jan. 25, 2007, which is incorporated by reference herein.

BACKGROUND OF THE INVENTION

1. Technical Field

The present invention relates to multi-core processors in general, and more particularly, to a method for performing a matrix calculation using a multi-core processor.

2. Description of Related Art

In many science and technology evaluations, such as fluid analysis or structural analysis, calculations for finding a product of a sparse matrix and a vector are frequently performed. For example, in a conjugate gradient method, the solution of a system of linear equations in several variables is calculated by using an iterative solver. In an iterative solver, calculations of a product of a sparse matrix and a vector are iteratively performed until the solution converges. For the purpose of efficiently performing such calculations, several techniques have been proposed. For example, when all vector data cannot be stored in a cache memory of a processor, the occurrence of a cache miss is reduced by replacing rows or columns with subsequent ones in advance in order that parts of the vector data stored in the cache memory can be accessed continuously. Moreover, some amount of read out time is saved by simultaneously reading out four elements of a sparse matrix as a block of two elements by two elements instead of reading out non-zero elements of the sparse matrix one by one from a memory or a hard disk drive.

In recent years, multi-core processors have been widely employed. A multi-core processor includes processor elements formed on a single processor chip. Each of the processor elements operates independently from and also in parallel with the other processor elements. In addition, a multi-core processor includes cache memories respectively within the processor elements. Since the processor elements can access the cache memories quickly, an arithmetic operation can also be processed quickly if data to be used by the processor elements during the same period of time can be previously stored in cache memories. However, it is not easy for the multi-core processor to perform a process of keeping consistency of data between a cache memory and a system memory, or between a cache memory and another cache memory. Since the process requires a large amount of hardware resources, there are many cases where a structure of the multi-core processor becomes complicated.

For this reason, with an attempt to simplify the structure of the processor by causing a software program to manage consistency of data, there has been developed a multi-core processor from which a function to keep consistency of data is removed. For example, a Cell processor (Cell Broadband Engine[7]) includes, within the processor, a local memory without a function to keep consistency of data, instead of a cache memory. Thereby, the hardware structure inside the processor can be simplified. In this case, another function may be also provided to the processor and the operation speed of the processor can be improved as well. If keeping consistency of data is required in this case, a control by a software program is necessary, however. In addition, since a processor having such structure is a completely new processor that has not existed so far, software techniques that have been studied cannot be applied to the new processor without modifications or changes. This logic also applies to matrix operations as well.

For example, since a Cell processor does not include a cache memory, the technique to reduce the occurrence of a cache miss cannot be applied to a Cell processor without modifications or changes. In addition, on the basis of a comparison of a Cell processor to a conventional multiprocessor parallel computer system, one may think that conventional techniques related to a parallel computer system can be applied to a Cell processor. Such idea is invalid, however. First, since the size of data that can be stored in a local memory is extremely small as compared with that of a memory of a parallel computer system, there are cases when the content of the local memory is frequently updated when the same techniques are applied to a Cell processor. Second, while a Cell processor achieves a extremely fast communication speed between local memories in comparison with a communication speed of accessing a system memory, a parallel computer system achieves a communication speed between nodes approximately the same as that of accessing a system memory or even slower. For this reason, although an attempt to reduce the amount of communications between nodes is advantageous in a parallel computer system, it is preferable that communications be even utilized actively in a Cell processor.

SUMMARY OF THE INVENTION

In accordance with a preferred embodiment of the present invention, a data processing system for performing a matrix calculation includes a multi-core processor with multiple processing elements each having a processor and a local memory. The system memory stores a value matrix in which non-zero elements of an input matrix are arranged, and a position matrix including elements each indicating positions of the non-zero elements of the input matrix. A first processing element having a first local memory for storing a first sub-vector that is a part of the input vector. A second processing element having a second local memory for storing a second sub-vector that is another part of the input vector.

The first readout unit is configured to read out matrix elements sequentially one by one from the value matrix and from the position matrix stored in the system memory, and to store the read out matrix elements in the first local memory as newly-read matrix elements. The first arithmetic unit in the first processing element is configured to multiply two matrix elements every time a matrix element is read out by the first readout unit, wherein one of the two matrix elements corresponds to the position of a non-zero element indicated by each of the matrix elements read out from the position matrix in the first sub-vector, and the other of the two matrix elements being a non-zero element read out from the value matrix in the first sub-vector.

The second readout unit is configured to read out a matrix element of the value matrix and the position matrix from the first local memory, and to store the matrix element in a second local memory as a newly-read matrix element every time an arithmetic operation is performed by the first arithmetic unit. The second arithmetic unit in the second processing element is configured to multiply two matrix elements every time a matrix element is read by the second readout unit, wherein one of the two matrix elements corresponds to a position of a non-zero element indicated by each of the matrix elements read from the position matrix in the second sub-vector, and the other of the two elements being a non-zero element read from the value matrix in the second sub-vector.

The output unit in the second processing unit is configured to generate each matrix element of a vector to indicate a product of the input matrix and the input vector based on results of the arithmetic operations performed by the first and second arithmetic units, and to store the matrix element in the system memory.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIGS. 3A and 3B are diagrams showing a specific example of an arithmetic program;

DETAILED DESCRIPTION OF A PREFERRED EMBODIMENT

Figure 1:
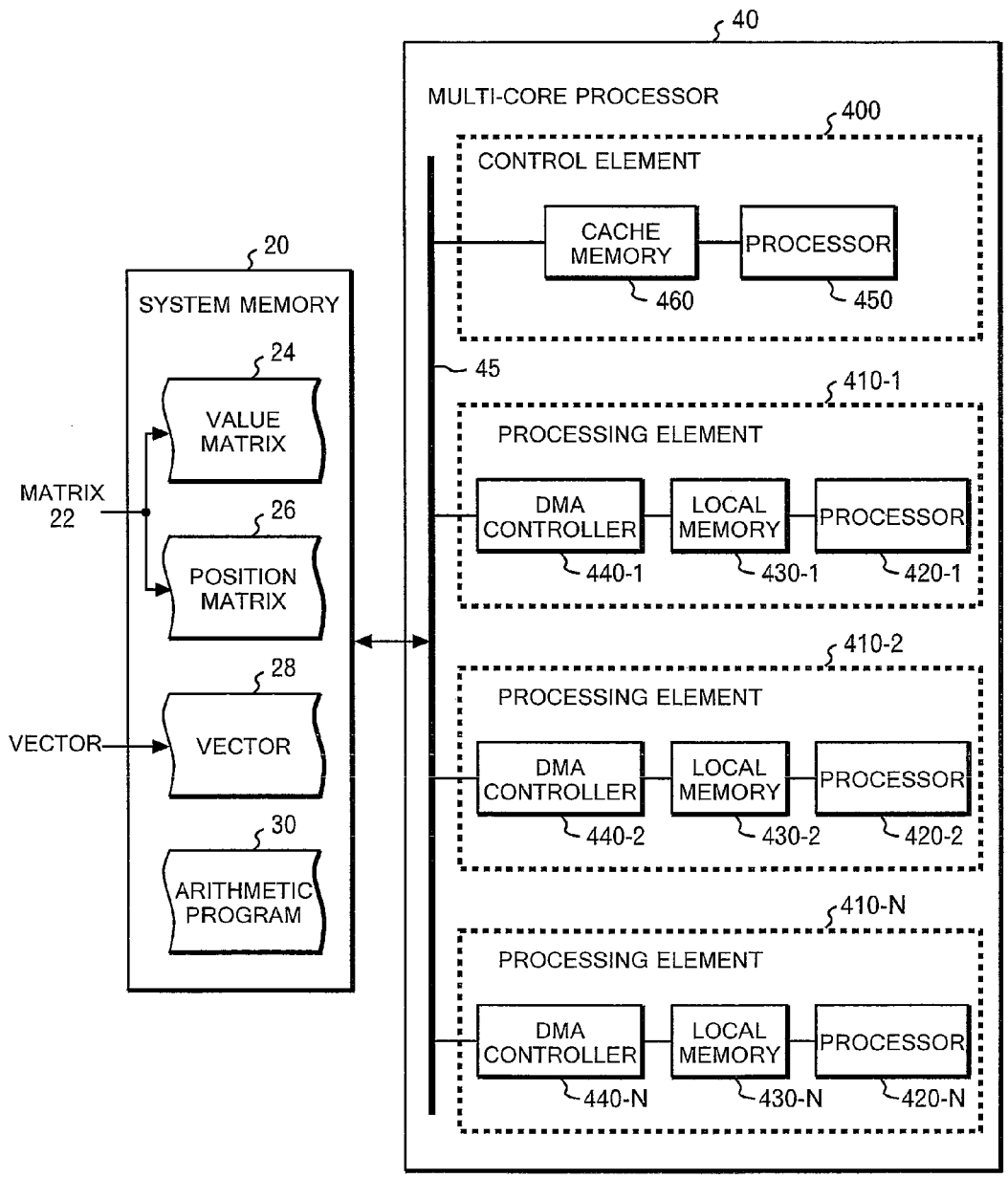
FIG. 1 is a block diagram of an arithmetic system.

Referring now to the drawings, and specifically to FIG. 1, there is depicted a block diagram of an arithmetic system 10. The arithmetic system 10 includes a system memory 20 and a multi-core processor 40 and is provided for the purpose of receiving a matrix 22 (which is a sparse matrix) and a vector and then of efficiently calculating the product of the matrix and vector by use of a parallel computing function included in the multi-core processor. The system memory 20 is a main storage memory. The system memory 20 is externally connected to the multi-core processor 40 and is accessed by the multi-core processor 40 or another input/output device via a host controller 1082 to be described later. The system memory 20 is configured to store therein data or a program required for an arithmetic processing. Specifically, the system memory 20 stores a value matrix 24 and a position matrix 26, which indicate an input matrix 22, an input vector 28 and an arithmetic program 30 for controlling the multi-core processor 40.

The multi-core processor 40 includes a control element 400, multiple processing elements 410-1 to 410-N) and an on-chip bus 45 for connecting these elements and the system memory 20. These components are integrally formed on a single microprocessor chip. The control element 400 is provided for supporting an arithmetic processing and, for example, causes an operating system to operate or performs a pre-processing or post processing of the arithmetic operation. For example, the control element 400 may perform a post-processing of an arithmetic operation by providing a program or data to each of the processing elements 410-1 to 401-N in advance. As a specific configuration, the control element 400 includes a processor 450 and a cache memory 460. As an example, in a case where the multi-core processor 40 is a Cell processor[7], the control element 400 is a PowerPC[7] processor and is capable of executing an existing program written using a command set of the PowerPC[7].

The processing elements 410-1 to 410-N operate mutually and independently and in parallel with one another. Each of the processing elements 410-1 to 410-N receives data from the system memory 20 or a different processing element 410, then performs an arithmetic operation by use of the data, and then outputs a result of the arithmetic operation to the system memory 20 or the different processing element 410. A first processing element, which is one of the processing elements 410-1 to 410-N includes a first processor 420-1, a first local memory 430-1 and a first DMA controller 440-1. The processor 420-1 includes an arithmetic unit and a resistor and accesses the local memory 430-1 and to perform an arithmetic processing. The local memory 430-1 is a memory to be accessed by the processor 420-1 at an extremely high speed as compared with the system memory 20. The memory space of the local memory 430-1 is, however, extremely small as compared with the system memory 20. The memory space of a local memory is, for example, approximately 256 Kbyte in the case of a Cell processor.

The DMA controller 440-1 transfers instruction codes or data between the system memory 20 and the local memory 430-1, and between the local memory 430-1 and a different local memory 430 included in a different processing element 410. Accordingly, by issuing an instruction to the DMA controller 440-1, the processor 420-1 can read data or a program from the system memory 20 through the local memory 430-1 or read data or a program from a local memory 430 of a different processing element 410. This reading process is a process that is completed on an integrated processor chip called the multi-core processor 40. Thus, this process is performed at an extremely high speed as compared with a process of accessing the system memory 20.

The processing elements 410-2 to 410-N, which are the second to $N^{th}$ processing elements, also include the second to $N^{th}$ processors 420-2 to 420-N, the second to $N^{th}$ local memories 430-2 to 430-N and the second to $N^{th}$ DMA controllers 440-2 to 440-N, respectively, as in the case of the processing element 410-1. These processors, local memories and DMA controllers are substantially the same as the processor 420-1, the local memory 430-1 and the DMA controller 440-1. Accordingly, descriptions as to the processing elements 410-2 to 410-N and the components included therein are omitted.

Figure 2:
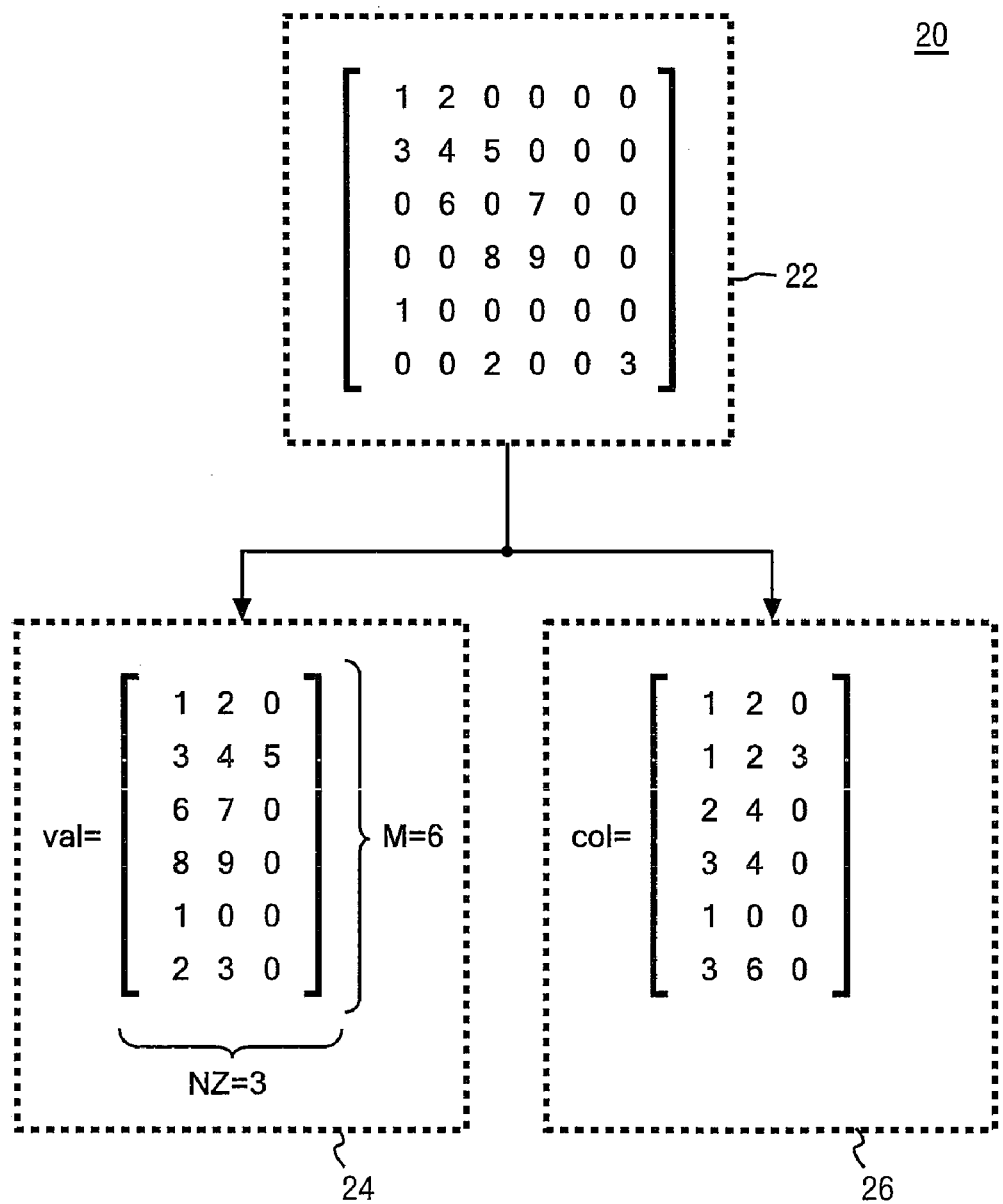
FIG. 2 is a diagram showing specific examples of a matrix, a value matrix and a position matrix.

FIG. 2 shows specific examples of the matrix 22, the value matrix 24 and the position matrix 26. While referring to FIG. 2, a description will be given of a relationship of the matrix 22, and the value matrix 24 and the position matrix 26, which are stored in the system memory 20. The matrix 22 is a sparse matrix having a number of zero elements equal to or more than half of the total elements and is, for example, a square matrix of 6 rows by 6 columns. The value matrix 24 is a matrix having the non-zero elements of the matrix 22 arranged therein. The value matrix 24 is a matrix including row vectors each formed of a non-zero element of each of the rows of the matrix 22, as the element of each of the row vectors, arranged therein. In FIG. 2, the value matrix 24 is a matrix value of 6 rows by 3 columns. Each of the rows of the value matrix 24 includes in the array of matrix a non-zero element included in each of the same rows of the matrix 22. For example, the non-zero elements, 3, 4 and 5 are arranged in the second row of the matrix 22, and thus the three non-zero elements, 3, 4 and 5 are arranged in the second row of the value matrix 24 likewise, as shown in FIG. 2.

Furthermore, as to the fourth row, although two non-zero elements 8 and 9 are respectively arranged in the third and fourth columns of the matrix 22, the two non-zero elements 8 and 9 are arranged in the first and second columns of the value matrix 24 regardless of the positions of the columns where the elements are located in the matrix 22. Moreover, the number of non-zero elements is two in this fourth row. Since the number of non-zero elements in this fourth row is less than the number of columns of the value matrix 24, which is three, a zero is arranged in addition to the two non-zero elements. As described above, as long as the value matrix 24 includes all the non-zero elements of the matrix 22, the matrix 24 may include a zero in addition to the non-zero elements. In addition, the number of rows of the value matrix 24 is denoted by a variable M, and the number of columns of the value matrix 24 is denoted by a variable NZ in the descriptions provided below. Specifically, M=6 and NZ=8 in this example.

The position matrix 26 is a matrix indicating the positions of non-zero elements of the matrix 22. Specifically, the position matrix 26 is a matrix formed of row vectors arranged therein, each of which is formed of elements each being a value indicating the position of a non-zero element in each of the rows of the matrix 22. The position matrix 26 is a matrix column of 6 rows by 3 columns in FIG. 2. Each of the rows of the position matrix 26 includes in the array of matrix an element indicating the position of a non-zero element included in each of the same rows of the matrix 22. For example, as to the third row, since the non-zero elements 6 and 7 are respectively arranged in the second and fourth columns of the matrix 22, the values 2 and 4 respectively indicating the positions of the columns are arranged in this order in the position matrix 26. Likewise, since the non-zero elements 2 and 3 are respectively arranged in the third and sixth columns in the sixth row of the matrix 22, the values 3 and 6 respectively indicating the positions of the columns are arranged in this order in the position matrix 26.

As described above, when the matrix 22, which is a sparse matrix, is represented by use of the value matrix 24 and the position matrix 26, a storage space required originally for storing the zero-elements can be reduced. In addition, an unnecessary arithmetic processing for the zero elements can be omitted. Although a sparse matrix of 6 rows by 6 columns is used in this example, there is a case where a sparse matrix of several tens of thousands of rows by several tens of thousands of columns is used in an actual science and technology calculation. Accordingly, the effects of saving the memory space and the arithmetic processing, obtained by omitting zero elements, are significant. As shown in FIG. 2, as the matrix 22, non-zero elements are not necessarily concentrated in a certain area, and there is a case where non-zero elements are distributed at various positions of rows and columns. In an attempt to efficiently calculate a product of such a matrix and a vector without performing arithmetic operations on zero elements, each element in a vector may be randomly accessed. An example of a program for performing such access is shown in FIG. 3.

FIGS. 3A and 3B show specific examples of an arithmetic program 30. In FIG. 3A, a program that runs on the processor 420-1 is shown. In FIG. 31, a program that runs on the processor 420-2 is shown. These programs are configured to calculate a product obtained by multiplying the matrix 22, which is a sparse matrix, by the vector 28 from the right. As shown in the first and seventh lines in FIG. 3A, the programs of the second to the sixth lines are repeated the same number of times as that of the number of rows M, and the number of times of the repetition is stored in an induction variable i. In the second line, an array variable y is initialized to zero. In accordance with each element of the vector of the result of the arithmetic operation, this variable y stores an intermediate step of the arithmetic operation of the element. In the third line, the $i^{th}$ lines of the matrix 22 and value matrix 24 are read out from the system memory 20 to the local memory 430-1.

From the fourth to sixth lines, the arithmetic operation shown in the fifth line is repeated the same number of times as that of the number of columns NZ. In the fifth line, the element in row i and column j in the position matrix 26 is read out from the local memory 430-1. Then, a vector element is read out from an array variable x indicating the vector 28 with the number indicated by the read out element as a suffix. The read out element is multiplied by the element in row i and column j of the value matrix 24 and added to the i element of the variable y. It should be noted that the processing to be performed in FIG. 3B is almost same as that in FIG. 3A, a description of the specific processing will be given later.

It should be also noted that as shown in line 3, although elements in the matrix 22 or the like are read out in unit of row one by one, here, as long as the reading out process is performed for one set of matrix elements, it may be performed in a different way. For example, elements in a predetermined number of columns may be read out in unit of column or elements may be read out in unit of row obtained by further dividing a row instead of using the row without being divided. Such a change in the unit used in the read out processing is executed by changing an element to become a LOAD target or by changing a timing of a LOAD process. The changing of timing is executed by dividing the loop process starting from the line 1 in FIG. 3A into multiple loop processes of smaller units and then by issuing a LOAD command for each external loop process. In addition, the changing of timing is executed by performing loop expansion on a part of the loop process starting from the line 3 in FIG. 3A.

In the line 5 of the program shown in FIG. 3A, the array variable x is randomly accessed in accordance with elements numbers sequentially read out from the position matrix 26. Specifically, as to the sixth row of the position matrix 26, as a result of the elements 3 and 6 being sequentially read out, the third and sixth elements of the array variable x are sequentially accessed, for example. As described above, in the multiplication of a sparse matrix and a vector, in an attempt to omit an arithmetic operation related to a zero element, an element of the vector is randomly accessed. For this reason, when the number of elements of the vector is so large that the elements cannot be stored in the local memory 430, a process to replace the elements to be stored in the local memory 430 with others needs to be frequently performed. Since this process requires access to the system memory 20, the efficiency of the process is not good. In addition, the access timing is unknown until the position matrix 26 is read out.

In contrast to this, in the case of the arithmetic system 10 according to the present embodiment, a vector whose access position is difficult to be predicted is divided into pieces in advance, and then, each of the divided parts of the vector is stored in multiple local memories 430. Then, a matrix to be accessed in a sequential manner is read out in a streaming manner. As a result, the required space of the local memories 430 can be reduced and arithmetic operations can be efficiently performed in the meantime. The description will be given below in more detail.

Figure 4:
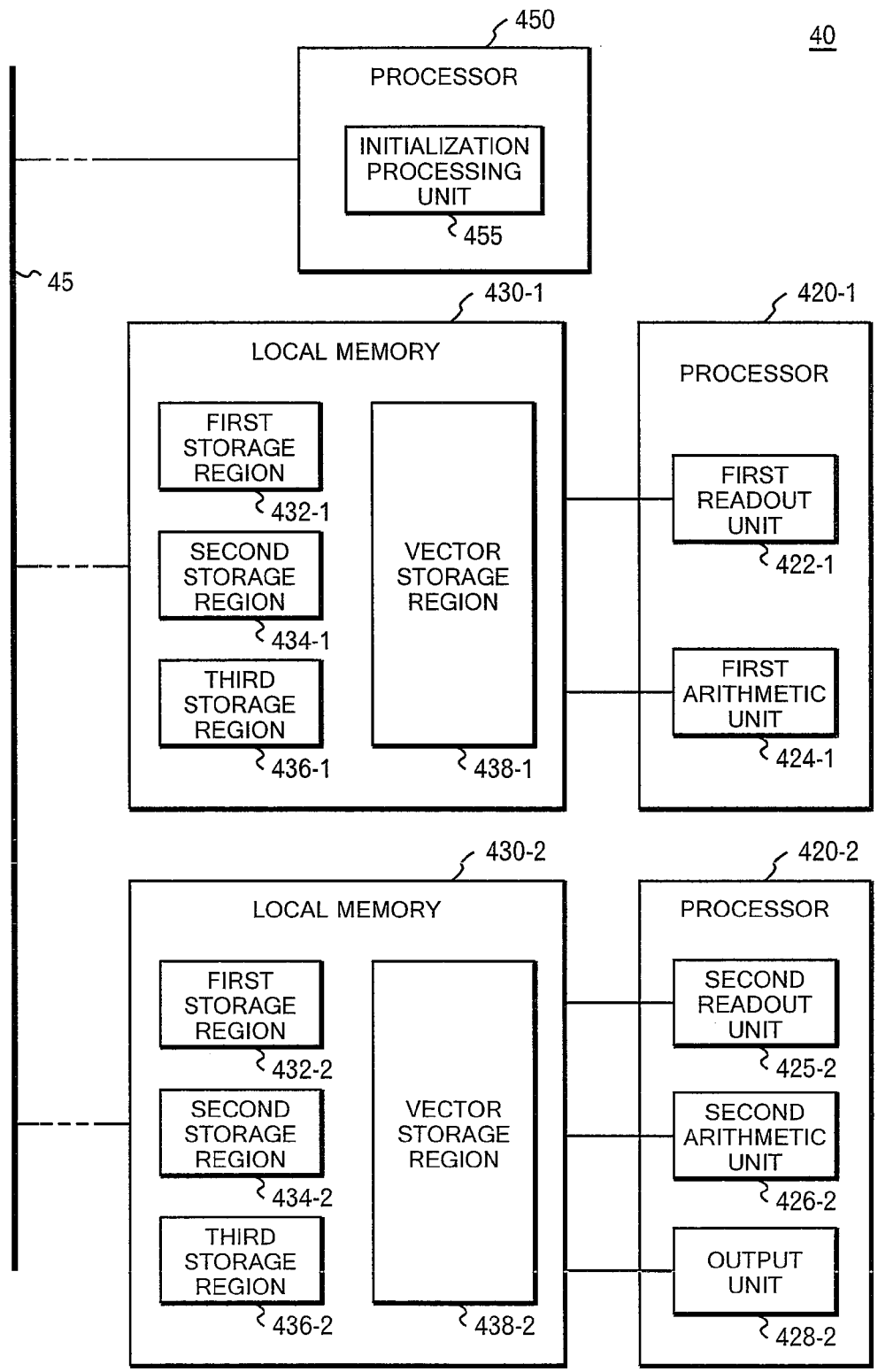
FIG. 4 is a block diagram of a multi-core processor, in accordance with a preferred of the present embodiment.

FIG. 4 shows a functional configuration of the multi-core processor 40, in accordance with a preferred embodiment of the present invention. A description will be given of a processing function of a matrix operation with reference to FIG. 4 while focusing attention on the control element 400, the processing elements 410 and the processors 420, which are included in the multi-core processor 40. The multi-core processor 40 includes an initialization processing unit 455 operating under the control of the processor 450. This initialization processing unit 455 is operated according to an instruction from the arithmetic program 30 or an operating system. The initialization processing unit 455 is operated in cooperation with a host controller 1082, a hard disk drive 1040, a communication interface 1030 or the like to be described later and then performs various processes for supporting an arithmetic processing. For example, the initialization processing unit 455 may externally receive the matrix 22 or read out the value matrix 24 or the position matrix 26 from the hard disk drive 1040. In addition, the initialization processing unit 455 may provide each of the local memories 430-1 to 430-N with data or a program that is required for an arithmetic processing.

The multi-core processor 40 includes a first readout unit 422-1 and a first arithmetic unit 424-1, which operate according to an instruction from the arithmetic program 30 controlled by the processor 420-1. Moreover, the local memory 430-1 includes a first storage region 432-1, a second storage region 434-1, a third storage region 436-1 and a vector storage region 438-1. The multi-core processor 40 includes a second readout unit 425-2, a second arithmetic unit 426-2 and an output unit 428-2, which operate according to instructions from the arithmetic program 30 controlled by the processor 420-2. Moreover, the local memory 430-2 includes a first storage region 432-2, a second storage region 434-2, a third storage region 436-2 and a vector storage region 438-2.

The local memory 430-1 stores in the vector storage region 438-1 a first sub-vector that is a part of the vector 28. For example, in an attempt to store the entire vector 28 in the local memories 430-1 and 430-2, the vector 28 may be divided into two parts. Then, the local memory 430-1 may store an element of the top part of the vector 28. Then, the local memory 430-2 stores another part of the vector. A second sub-vector may be formed of an element in the last part of the vector that is divided into two parts.

The first readout unit 422-1 sequentially reads out matrix elements from each of the value matrix 24 and the position matrix 26 stored in the system memory 20, and then stores the read matrix elements in the local memory 430-1 by replacing, with the matrix value matrix elements that have been already read out. From the hardware point of view, this process is executed by issuing instructions of reading and storing processes from the first readout unit 422-1 to the DMA controller 440-1. From the software point of view, this process corresponds to the line 3 of the process in FIG. 3A, and this LOAD command is issued to an address assigned to a storage region of the system memory 20, for example.

Moreover, the first storage region 432-1 is provided for storing a read out matrix element. The second storage region 434-1 is provided for storing a matrix element used in an arithmetic operation. The third storage region 436-1 is provided for storing a matrix element that has been already used in an arithmetic operation. Specifically, the read out matrix element is first stored in the first storage region 432-1, then is copied into the second storage region 434-1 before the arithmetic process, and then is further copied into the third storage region 436-1 after the arithmetic process. It should be noted that the first to third storage regions are provided for efficiently performing a parallel process. Each of the local memories 430-1 and 430-2 may include a single storage region or two storage regions in addition to the vector storage region.

Every time a matrix element is read out by the first readout unit 422-1, the first arithmetic unit 424-1 performs an arithmetic operation of multiplying two elements, one of the two elements corresponding to the position of a non-zero element indicated by each of the matrix elements read out from the position matrix 26 in the first sub-vector, and the other of the two elements being the non-zero element read out from the value matrix 24 in the first sub-vector. For example, when a matrix element, 3, is read out from the position matrix 26, the third element of the first sub-vector is multiplied as the corresponding element by a matrix element of the value matrix 24. The results of the arithmetic operations are summed up and then stored in the second storage region 434-1 of the local memory 430-1. This process corresponds to the process in the lines 4 to 6 of FIG. 3A. The program preferably includes a setting in advance that zero is read out as a result of an access when the array variable x is accessed by a suffix exceeding the number of elements in the first sub-vector.

Every time an arithmetic operation is performed by the first arithmetic unit 424-1, the second readout unit 425-2 reads out from the local memory 430-1 and stores a matrix element of each of the value matrix 24 and the position matrix 26 in the local memory 430-2 by replacing, with the matrix element, a matrix element that has been already read out. From the hardware point of view, this process is executed by issuing instructions of reading and storing processes from the second readout unit 425-2 to the DMA controller 440-1 and 2. From the software point of view, this process corresponds to the line 3 of the process in FIG. 3B, and this LOAD command is issued to an address assigned to a storage region of the local memory 430-1, for example. Furthermore, the second readout unit 425-2 reads out from the local memory 430-1 and stores, in the local memory 430-2, a result of the arithmetic operation performed by the processor 420-1. This process corresponds to the process of the line 2 in FIG. 3B.

It should be noted that the reading out process to be performed by the second readout unit 425-2 means a data transfer from the local memory 430-1 to the local memory 430-2, and it does not matter if the transfer is to be performed directly or indirectly. Specifically, a matrix element read out from the local memory 430-1 is once stored in a local memory (for example, it is assumed to be the local memory 430-M) of a different processing unit, and then, the stored matrix element may be read out by the second readout unit 425-2 and then be stored in the local memory 430-2. In addition, the second readout unit 425-2 may be provided for the processor 420-1 instead of the processor 420-2. Then, the second readout unit 425-2 may first read out a matrix element first from the local memory 430-1 and then execute this data transfer by issuing a write command with respect to the local memory 430-2 for the element as the data.

As in the case of the local memory 430-1, the read out matrix element may be first stored in the first storage region 432-2, then be copied into the second storage region 434-2 before an arithmetic process, and then be further copied into the third storage region 436-2 after the arithmetic process.

Every time a matrix element is read out by the second readout unit 425-2, the second arithmetic unit 426-2 performs an arithmetic operation of multiplying two elements, one of the two elements corresponding to the position of a non-zero element indicated by each of the matrix elements read out from the position matrix 26 in the second sub-vector, and the other of the two elements being the non-zero element read out from the value matrix 24 in the second sub-vector. For example, when a matrix element, 5, is read out from the position matrix 26, the second element (an element obtained by subtracting the number of elements, 3, of the first sub-vector from 5) of the second sub-vector is multiplied as the corresponding element by a matrix element of the value matrix 24. Each of the results of the arithmetic operations is added to the result of the arithmetic operation performed by the processor 420-1 and then stored in the local memory 430-2. This process corresponds to the process in the lines 4 to 6 of FIG. 3B. On the basis of the results of the arithmetic operations performed by the first and second arithmetic units 424-1 and 426-2, the output unit 428-2 creates elements of the vector indicating a product of the matrix 22 and the vector 28 and stores the elements in the system memory 20. In the example shown in FIG. 4, since the results of the arithmetic operations are sequentially added to one another, the output unit 428-2 can simply output the resultant arithmetic operation to the system memory 20. The seventh line of FIG. 3B shows an example in which this process is performed for each row.

Figure 5:
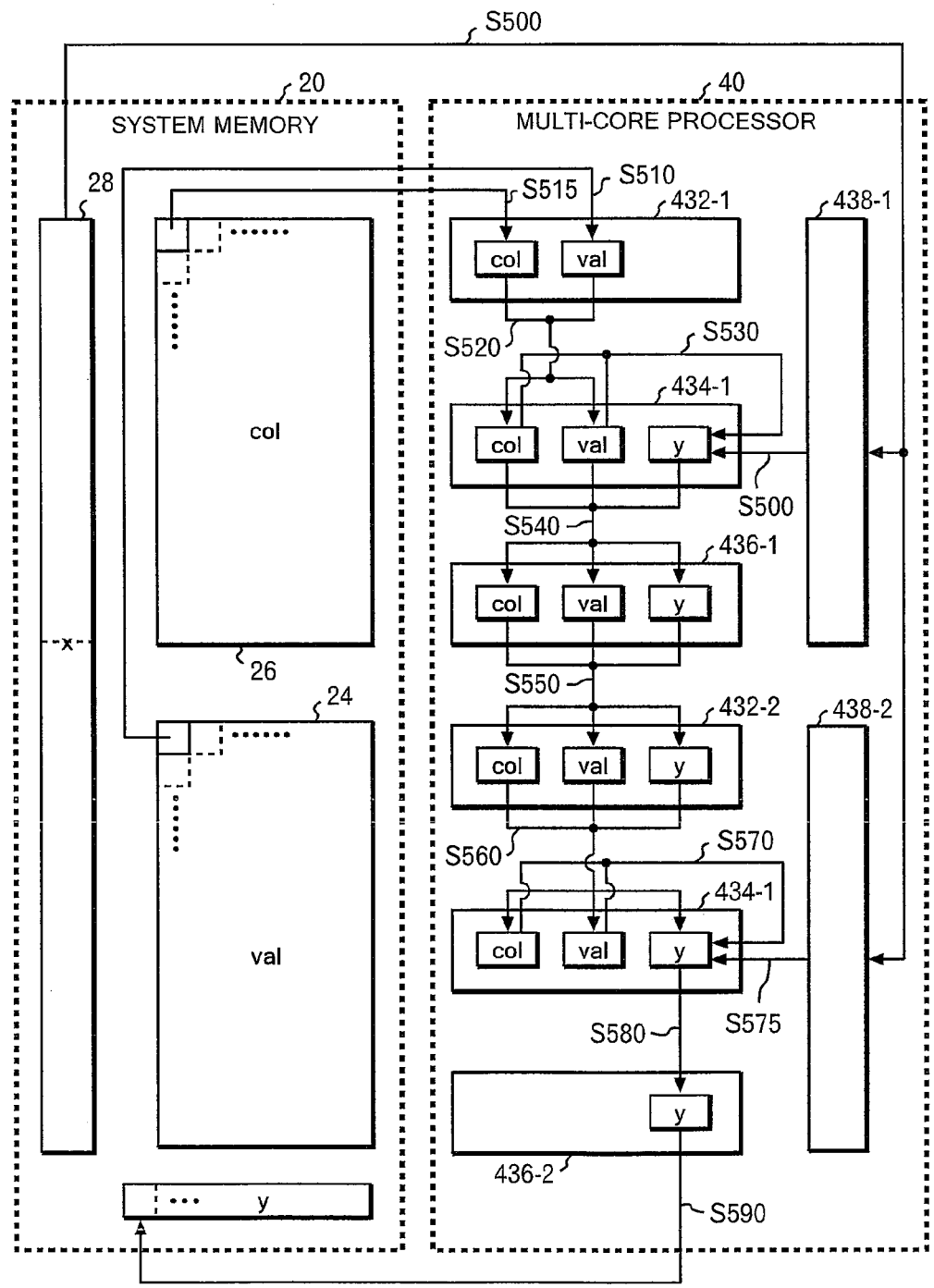
FIG. 5 is a block diagram showing a flow of a matrix operation process performed by a multi-core processor.

FIG. 5 shows a flow of a matrix arithmetic process performed by the multi-core processor 40, in accordance with a preferred embodiment of the present invention. The multi-core processor 40 reads out from the system memory 20 and stores, in the vector storage region 438-1, the first part of a vector, which is a part of the vector 28, in advance (S500). In addition, the multi-core processor 40 reads out from the system memory 20 and stores, in the vector storage region 438-2, the second part of a vector, which is another part of the vector 28, in advance. The first readout unit 422-1 reads out matrix elements of the value matrix 24 from the system memory 20 sequentially one by one and stores a newly-read matrix element in the first storage region 432-1 by replacing the previously read matrix element with the newly-read matrix element in the first storage region 432-1 (in other words, the matrix element read out from the value matrix 24 last time) (S510). Moreover, the first readout unit 422-1 reads out matrix elements of the position matrix 26 sequentially one by one from the system memory 20 and stores a newly-read matrix element in the first storage region 432-1 by replacing the previously read matrix element with the newly-read matrix element in the first storage region 432-1 (in other words, the matrix element read out from the position matrix 26 last time) (S515).

The first arithmetic unit 424-1 reads out a matrix element from the first storage region 432-1 and stores the matrix element in the second storage region 434-1 (S520). Then, in parallel with a process of reading out another matrix element of another part to the first storage region 432-1, which is performed by the first readout unit 422-1 for the next arithmetic operation, the first arithmetic unit 424-1 performs an arithmetic operation by using the matrix element stored in the second storage region 434-1 (S530 and S535). The result of the arithmetic operation is stored in the second storage region 434-1. Specifically, the total value y of the products of the elements of the first sub-vector and the non-zero elements of the value matrix 24 is stored in the second storage region 434-1. The first arithmetic unit 424-1 reads out from the second storage region 434-1 and then stores, in the third storage region 436-1, a matrix element and a result of the arithmetic operation (S540).

In parallel with the next arithmetic operation performed by the first arithmetic unit 424-1, the second readout unit 425-2 reads out a matrix element from the third storage region 436-1 of the local memory 430-1 and stores a newly-read matrix element in the first storage region 432-2 by replacing a matrix element previously stored in the first storage region 432-2 of the local memory 430-2 (in other words, the matrix element read out from the third storage region 436-1 last time) (S550). Moreover, the second readout unit 425-1 further reads out the total value y from the third storage region 436-1 of the local memory 430-1 and stores a newly-read value in the first storage region 432-2 by replacing a total value previously stored in the first storage region 432-2 with the newly-read value.

The second arithmetic unit 426-2 reads out from the first storage region 432-2 and stores the matrix element and the total value y in the second storage region 434-2 (S560). Then, in parallel with a process of reading out a matrix element to the first storage region 432-2 for the next arithmetic operation, which process is performed by the second readout unit 425-2, the arithmetic unit 426-2 performs an arithmetic operation by using the matrix element stored in the second storage region 434-2 (S570 and S575). By the arithmetic operation, the products of the element of the second sub-vector and each non-zero element of the value matrix 24 are calculated. Then, the products are summed up and added to the total value y read out from the local memory 430-1 and the resultant value is stored in the second storage region 434-2. Upon completion of the arithmetic operation as the condition, the second arithmetic unit 426-2 reads out from the second storage region 434-2 and stores the total value y in the third storage region 436-2 (S580). The output unit 428-2 reads out from the third storage region 436-2, and stores the total value y in the system memory 20 as each element of the vector indicating the product of the matrix 22 and the vector 28 (S590).

With reference to FIG. 5, the arithmetic system 10 divides into pieces in advance a vector data whose access position cannot be predicted and stores the pieces in local memories 430, and reads out matrix data to be accessed sequentially from the edge in a streaming manner. As a result, each of the processor 420 does not have to access the system memory 20 while interrupting the arithmetic operation during the middle of an arithmetic process. Thus, the arithmetic operation by each of the processors 420 can be efficiently performed by effectively utilizing the performance of the arithmetic operation of each of the processors 420. Furthermore, each of the arithmetic units operates in parallel with others. Specifically, in parallel with an arithmetic operation of the multiplication of an element of the first sub-vector and an element of the value matrix 24, the second arithmetic unit 426-2 performs an arithmetic operation of the multiplication of an element of the second sub-vector and another element of the value matrix 24. Thereby, the matrix operation to be normally processed by a single processor is partially processed by processors 420 simultaneously in parallel. Thus, in this case, it is possible to increase the processing efficiency extremely higher than that in the case where the process is performed by a single processor.

Next, with reference to FIGS. 6 to 10, a description will be given of a technique of further effectively utilizing the processing performance of the multi-core processor 40. Here, the technique will be shown as a modification example.

Figure 6:
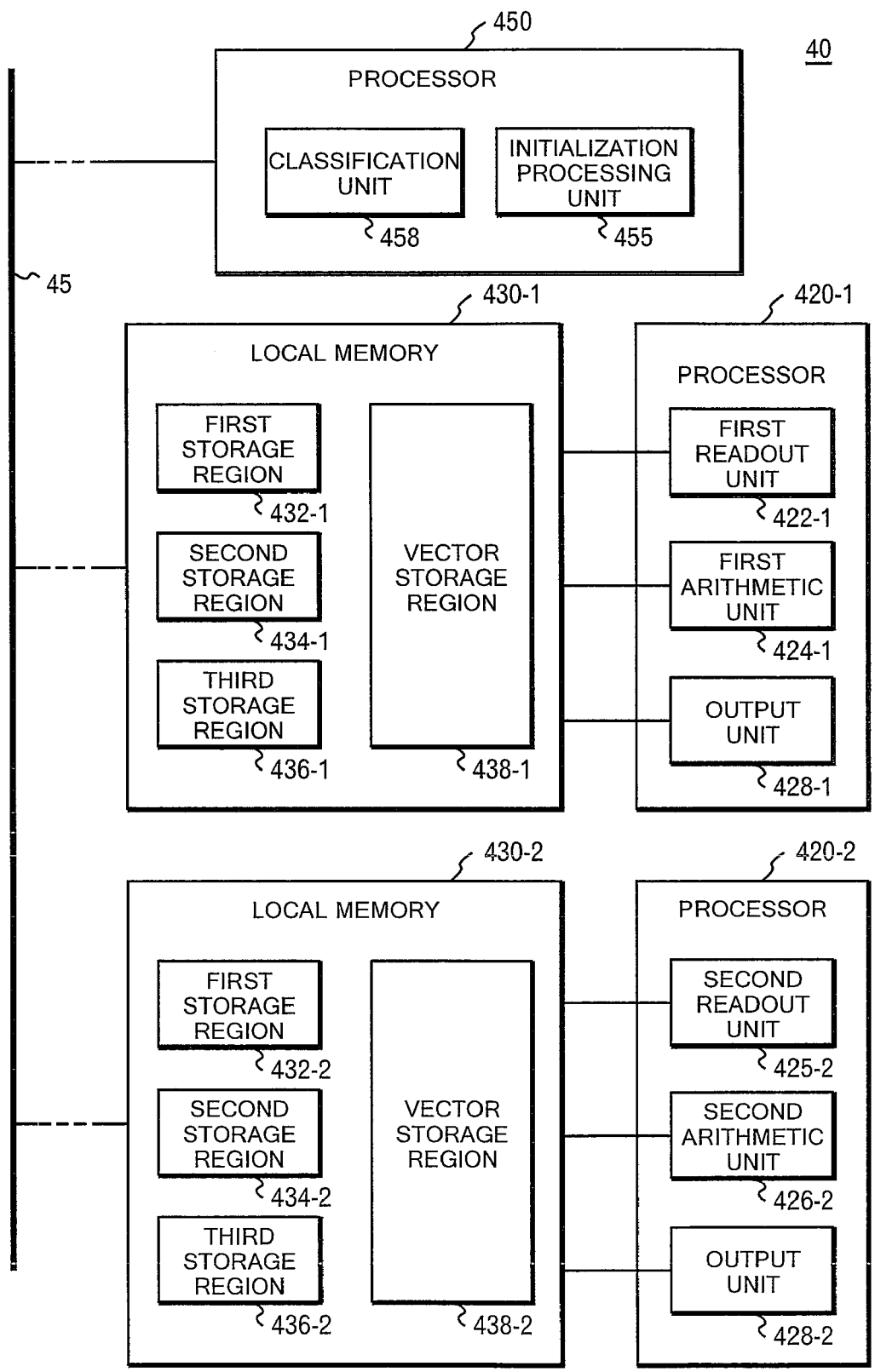
FIG. 6 is a block diagram showing a functional configuration of the multi-core processor, in accordance with a preferred of the present embodiment.

FIG. 6 shows a functional configuration of a multi-core processor 40, in accordance with a preferred embodiment of the present invention. In addition to the configuration shown in FIG. 4, the multi-core processor 40 further includes a classification unit 458 operating under the control of the processor 450, and an output unit 428-1 operating under the control of the processor 420-1. The classification unit 458 scans the position matrix 26 stored in the system memory 20 and classifies the rows of the matrix 22 into the first to third categories. The first category includes a row having a non-zero element to be multiplied by elements included in the first and the second parts of a vector. The second category includes a row that is other than a row included in the first category, and that has a non-zero element to be multiplied by an element included in the first part of a vector. The third category includes a row that is other than a row included the first category, and that has a non-zero element to be multiplied by an element included in the second part of a vector. Then, the classification unit 458 arranges in the system memory 20 the array sequence of the rows so that the rows can become continuous for each of the categories.

As in the case of the first readout unit 422-1 described in FIG. 4, the first readout unit 422-1 sequentially reads out, in a unit of the predetermined number of rows (for example, one row each), matrix elements of each of the value matrix 24 and the position matrix 26 stored in the system memory 20. However, the matrix element to be read out is limited to be in a row that is each of the rows of the value matrix 24 and the position matrix 26, and that corresponds to the first or second category. An element in a row corresponding to the row of the third category is excluded from the target row to be read out. If the classification unit 458 arranges each of the rows to be in the sequence of the second, first and third categories, the readout unit 422-1 can end the reading out of the rows when completing the reading out of the rows of the first category by sequentially reading out the rows from the top row. The first arithmetic unit 424-1 performs an arithmetic process every time a matrix element is read out by the first readout unit 422-1. This arithmetic process is the same as that shown in FIGS. 4 and 5.

As in the case shown in FIG. 4, every time an arithmetic process is performed by the first arithmetic unit 424-1, the second readout unit 425-2 reads out a matrix element stored in the local memory 430-1. However, the matrix element to be read out is limited to be in a row that is in each of the value matrix 24 and the position matrix 26, and that corresponds to the row of the first category, and a row corresponding to the row of the second category is not included. Furthermore, the second readout unit 425-2 sequentially reads out from the system memory 20 matrix elements in a row that is in each of the value matrix 24 and the position matrix 26, and that corresponds to the row of the third category. The second arithmetic unit 426-2 performs an arithmetic process every time a matrix element is read out by the second readout unit 425-2. This arithmetic process is the same as that shown in FIGS. 5 and 6.

The output units 428-1 and 2 work in cooperation with each other and then function as the output unit according to the present embodiment. Then, the output unit 428-2 creates elements of a vector showing products as to the results of the arithmetic operations performed as to the rows of the first category by the first arithmetic unit 424-1 and the second arithmetic unit 426-2, and the results of the arithmetic operations as to the rows of the third category by the second arithmetic unit 426-2. The output unit 428-2 then stores the elements in the system memory 20. In addition, the output unit 428-1 stores the results of the arithmetic operations performed by the first arithmetic unit 424-1 as to the rows of the second category in the system memory 20.

Figure 7:
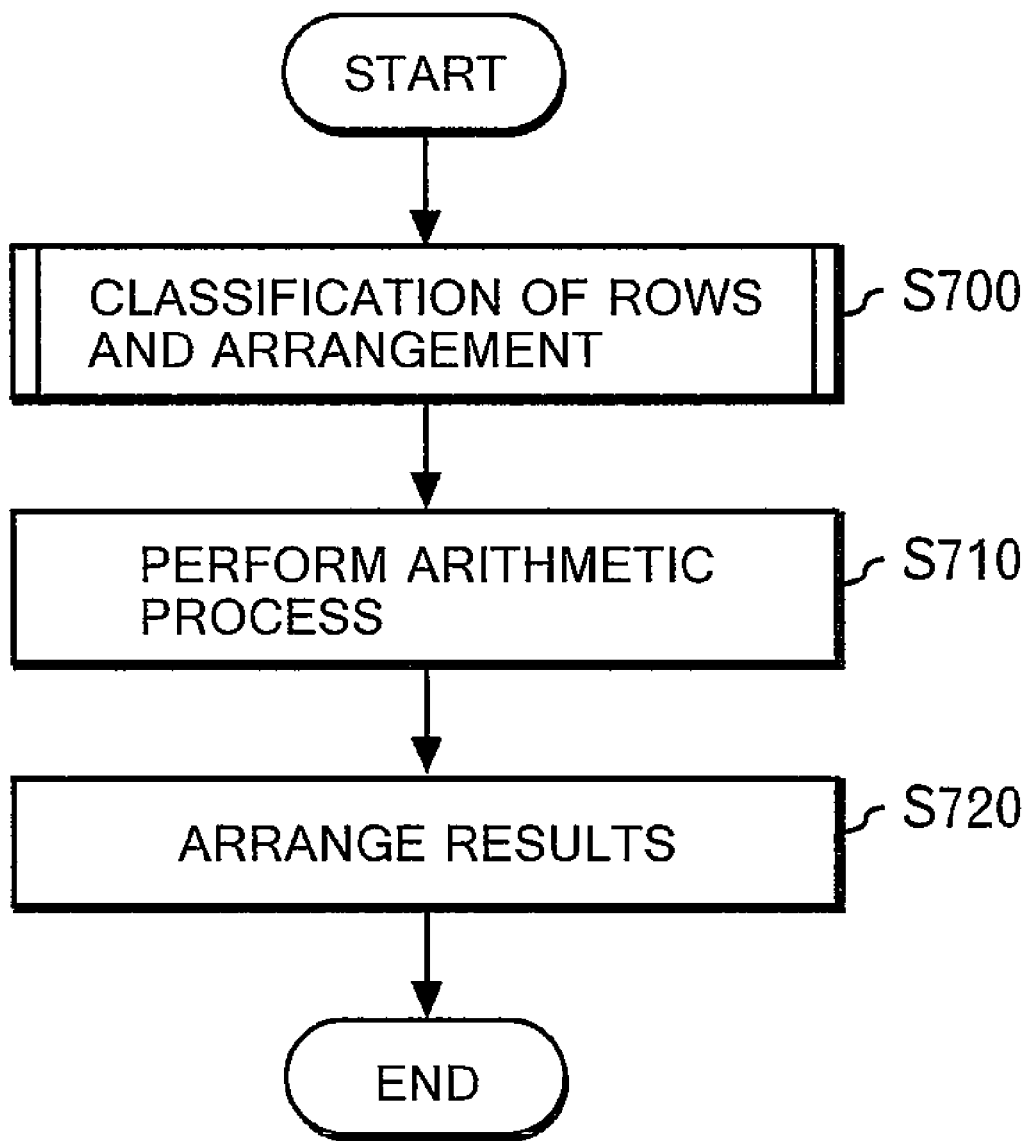
FIG. 7 is a flowchart showing a flow of a matrix operation process performed by a multi-core processor, in accordance with a preferred of the present embodiment.

FIG. 7 is a flowchart of a matrix operation process to be performed by the multi-core processor 40, in accordance with a preferred embodiment of the present invention. The classification unit 458 classifies rows of the matrix 22 into the first to the third categories (S700). The classification unit 458 preferably arranges the classified rows in the sequence of the second, first and third categories in the system memory 20. Next, the processing elements 410-1 and 2 mutually operate in parallel with each other and perform arithmetic operations of the multiplications of rows from the right of the matrix 22 and the vector 28 (S710). Thereafter, the output unit 428-2 preferably arranges the elements of the vector, each of which is the result of the arithmetic operation, in the original sequence, by a process reverse to the arrangement process performed by the classification unit 458 (S720).

Figure 8:
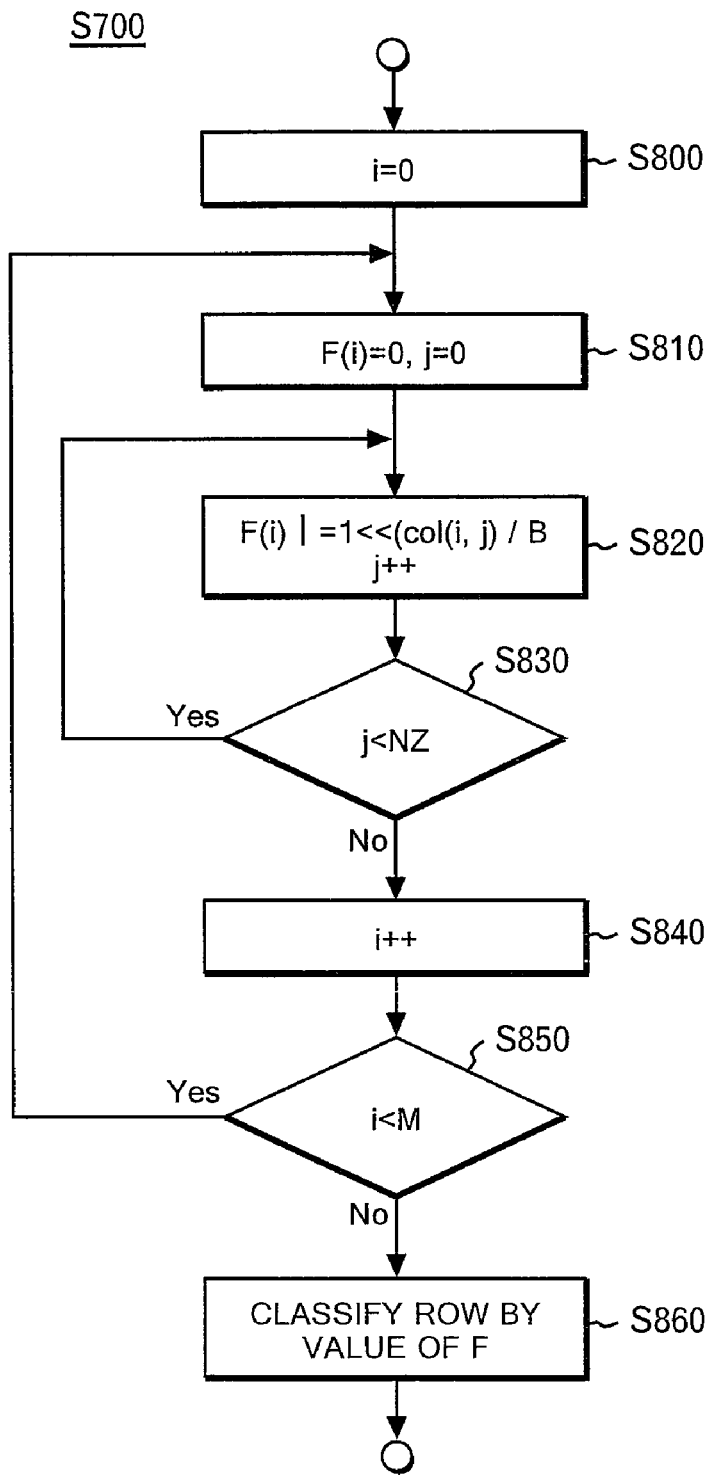
FIG. 8 is a flowchart showing a specific example of the process of block S700 in FIG. 7.
Figure 9:
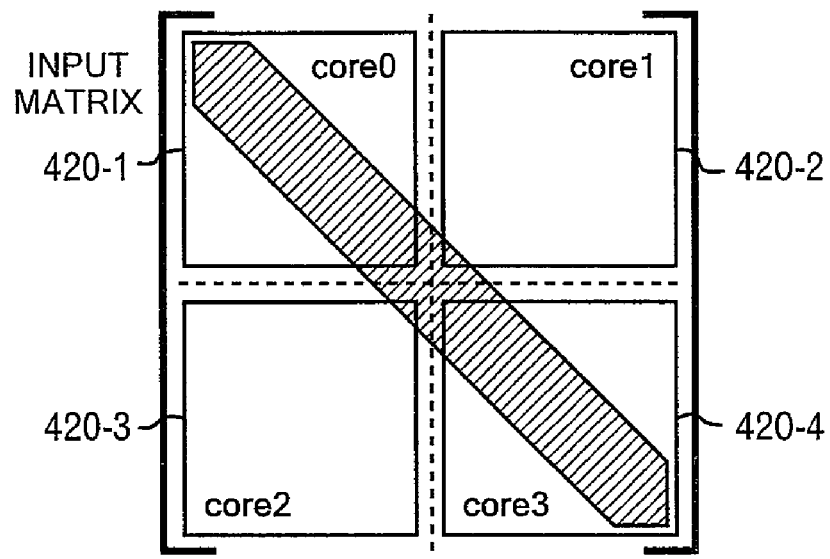
FIG. 9A is a logical diagram of the classification in block S700.
FIG. 9B is a conceptual diagram of the process in block S710 based on the classification.
Figure 9:
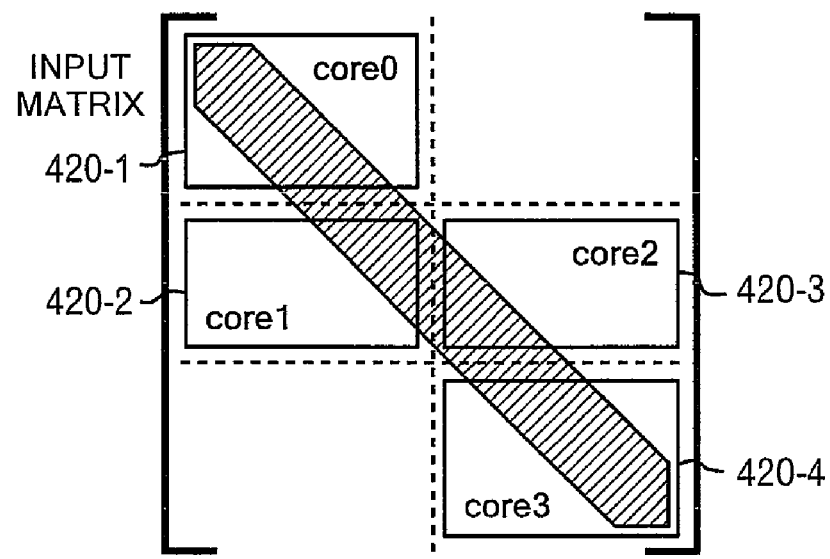

FIG. 8 shows a specific example of the process in S700 of FIG. 7. The classification unit 458 secures in the system memory 20 or the like a storage region for a variable i and then initializes the value thereof to 0 (S800). Next, the classification unit 458 secures a storage region for an array variable F having the number of elements set to be the number of rows M of the matrix 22, and initializes each of the elements to 0. The classification unit 458 then secures a storage region for a variable j and then initializes the value thereof to 0 (S810). Next, the classification unit 458 repeats the processes of S820 and S830 in order to classify the $i^{th}$ row. Specifically, the classification unit 458 first reads out an element in row i and column j of the position matrix 26 and then divides the element by a constant number B (S820). This constant number B indicates the number of processing elements 410 sufficient to store all of the elements of the vector 28. In this embodiment, this number of the processing elements is 2. At this time, any fraction is rounded off to become an integer. Then, the classification unit 458 shifts the binary constant 1 to the left by bit in accordance with the numeric value of the result of the division.

As a result of this process, as to a non-zero element to be multiplied by an element of the top part of the vector 28 divided into two pieces, the binary constant 01 is calculated. On the other hand, as to a non-zero value to be multiplied by an element of the last part of the vector 28 divided into the two pieces, a binary constant 10 is calculated. The logical sum of the result of the calculation and the value of F(i) is taken and the resultant value is assigned to the F(i). Furthermore, the variable j is incremented, thereafter. The classification unit 458 repeats the aforementioned process until the variable j reaches the number of columns NZ of the value matrix 24(S830). Subsequently, the classification unit 458 increments the variable i and determines whether or not the value of the variable i has reached the number of rows M(S850). If the value of the variable i has not reached M (S850: Yes), the classification unit 458 returns the process to S810. On the other hand, if the value of the variable i has reached M (S850: No), the classification unit 458 classifies each of the rows of the matrix 22 by the value of the array variable F(S860). Specifically, F(i) is any one of binary numbers 11, 01 and 10. Then, a row corresponding to 11 is classified into the first category, and a row corresponding to 01 is classified into the second category. Moreover, a row corresponding to 10 is classified into the third category.

FIGS. 9A and 9B are conceptual diagrams showing the classification process of S700 and the process of S710 based on the classification process. An arithmetic process based on the classification by the classification unit 458 is shown in FIG. 9B. The arithmetic process according to the embodiment shown in FIGS. 1 to 5 is shown in FIG. 9A in contrast to the process shown in FIG. 9B. In each of the diagrams, the matrix 22, which is a sparse matrix, is shown while being overlapped with the processor 420 performing an arithmetic operation for each element. The shaded area of each of the diagrams represents a non-zero element, and this sparse matrix has a non-zero element among diagonal elements or sub-diagonal elements.

As shown in FIG. 9A, each of the rows of the matrix 22 is separated into the top and last parts. The processors 420-1 and 420-2 respectively perform an arithmetic operation on the top and last parts of the row. Although each of the elements in the top or last part is calculated by the processors 420-1 and 420-2 in parallel when viewed from the direction of each of the rows, the elements as to a plurality of rows when viewed from the column direction are sequentially read out by the first readout unit 422-1 and sequentially calculated by the first arithmetic unit 424-1. For this reason, the amount of the time for calculation increases according to the number of rows. In order to reduce the amount of time for calculation, if each of the rows of the matrix 22 is divided into two parts, and if the processors 420-3 and 4 perform the same arithmetic operations as those of the processors 420-1 and 2 on the last half of the rows, the processes are efficiently completed since the group including the processors 420-1 and 2 and the group including the processors 420-3 and 4 operate in parallel with each other. However, focusing attention to the processors 420-2 and 3, the primary contents of the processes are receiving and passing matrix elements, and the substantial amount of a multiplication process is small, so that the processes are not efficiently performed.

In response to this, as shown in FIG. 9B, in the modification example, an arithmetic operation as a row of the second category, the row including a non-zero element only on the top part of the row divided into two pieces, is performed by only the processor 420-1. In addition, an arithmetic operation as to a row of the third category, the row including a non-zero element in the last half of the row divided into two pieces, is performed by only the processor 420-4. Moreover, an arithmetic operation as a row of the first category, the row in which non-zero elements in the top and last parts of the row are divided into two pieces, is performed by each of the processors 420-2 and 420-3. Then, the processes of classifying the rows into these categories mutually operate in parallel. As described above, according to this modification example, the amount of time required for the entire arithmetic operations can be reduced and the required calculation resources, for example, one that can be obtained by totaling the use time of each of the processors 420 (the portion of area denoted by core 0-3), can be saved.

As has been described so far, the entire process is efficiently performed by causing different processes to be performed on each of the first to third categories in this modification example. The flow of the process on the first category is the same as the one shown with reference to FIGS. 1 to 5. On the other hand, since the flows of the processes on the second and third categories require only one of the processors 420, the processes are different from the one shown in FIGS. 1 to 5. Subsequently, as a representative process of the processes on the second and third categories, the process on the second category is shown with reference to FIG. 10.

Figure 10:
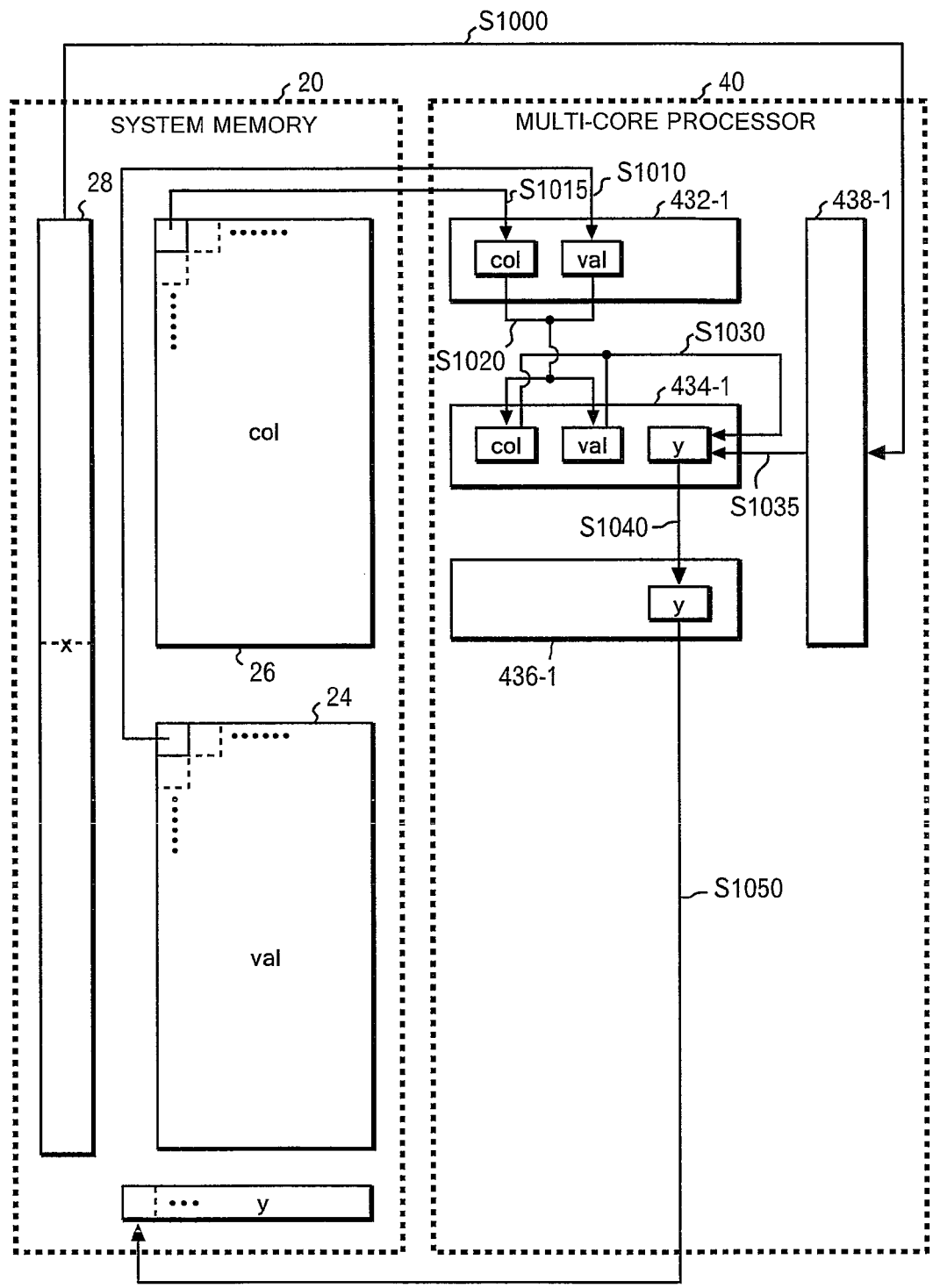
FIG. 10 is a block diagram showing a flow of a process of a matrix operation related to a row vector of the second category.

FIG. 10 shows a flow of an arithmetic process on a matrix as to a row vector of the second category. The multi-core processor 40 reads out, from the system memory 20, the first part of a vector, which is a part of the vector 28, and stores the vector in the vector storage region 438-1 in advance (S1000). The first readout unit 422-1 reads out matrix elements of the second category in the position matrix 26 one by one sequentially from the system memory 20, and stores a newly-read matrix element by replacing the previously read matrix element with the newly-read matrix element in the first storage region 432-1 (specifically, the matrix element read out from the position matrix 26 last time)(S1010, S1015).

The first arithmetic unit 424-1 reads out from the first storage region 432-1 and stores the matrix element in the second storage region 434-1 (S1020). Then, in parallel with the process of reading out another matrix element for the next arithmetic operation, the process being to be performed by the first readout unit 422-1, the first arithmetic unit 424-1 performs an arithmetic operation by using the matrix element stored in the second storage region 434-1 (S1030 and S1035). The result of the arithmetic operation is stored in the second storage region 434-1. Specifically, the total value y of the products of the element of the first sub-vector and each of the non-zero elements of the value matrix 24 is stored in the second storage region 434-1. Upon completion of the arithmetic operation as the condition, the first arithmetic unit 424-1 reads out from the second storage region 434-1 and stores a matrix element and a result of the arithmetic operation in the third storage region 436-1 (S1040). The total value y is outputted to the system memory 20 according to an instruction from the output unit 428-1 or the like (S1050).

It should be noted that the arithmetic operation performed on the third category is the same as the aforementioned one, and the description thereof can be provided by replacing the corresponding components used for the second category with ones to be used for the third category. Specifically, the description thereof can be given by replacing the components as follows: the second category with the third category; the vector storage region 438-1 with the vector storage region 438-2; the first storage region 432-1 with the first storage region 432-2; the second storage region 434-1 with the second storage region 434-2; the third storage region 436-1 with the third storage region 436-2; the first readout unit 422-1 with the second readout unit 425-2; the first readout unit 422-1 with the first readout unit 422-2; the first arithmetic unit 424-1 with the first arithmetic unit 424-2; and the output unit 428-1 with the output unit 428-2. Thereby, the arithmetic operation on the row having a non-zero element in one of the top and last parts of the vector 28 can be completed by a single processor 420. Thus, computer resources can be efficiently utilized.

Figure 11:
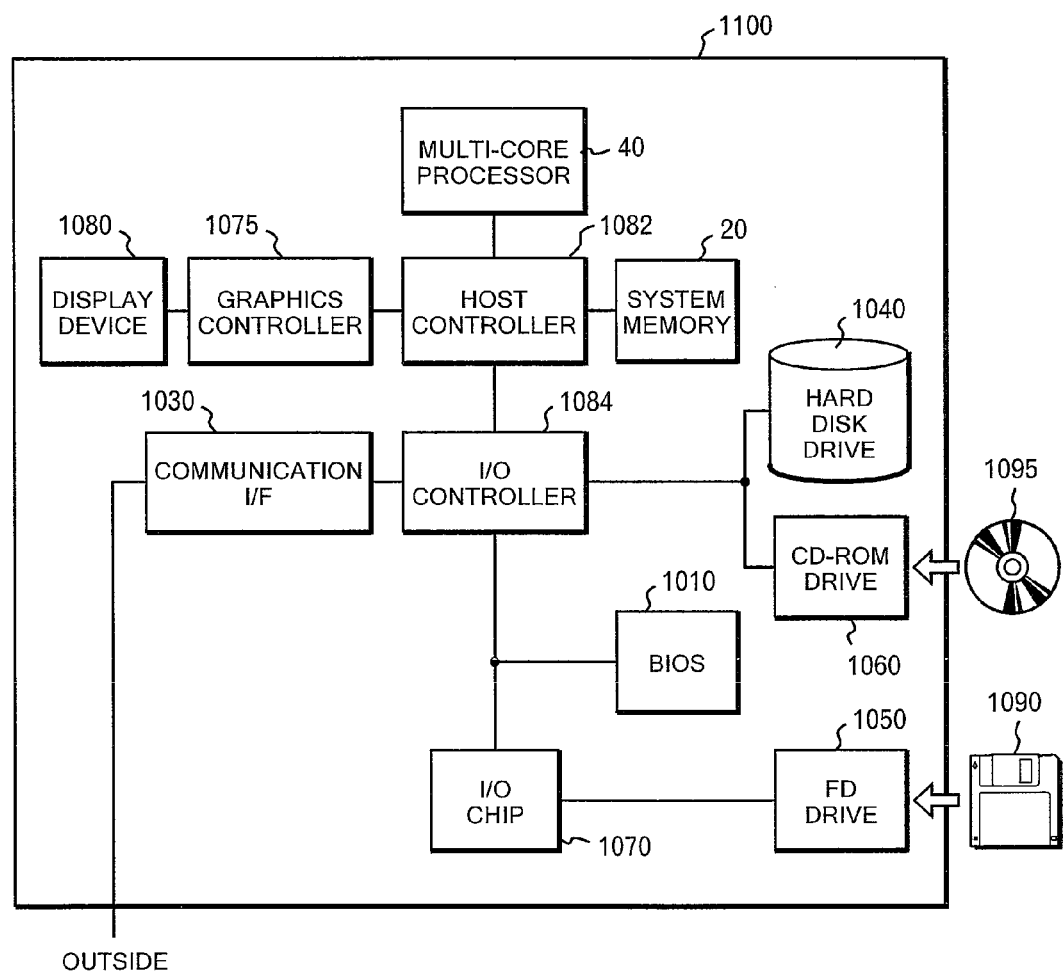
FIG. 11 is a block diagram showing an example of a hardware configuration of an information processing apparatus functioning as an arithmetic system, in accordance with a preferred of the present embodiment.

FIG. 11 shows an example of a hardware configuration of an information processing apparatus 1100 functioning as the arithmetic system 10 in the present embodiment or the modification example thereof. The information processing apparatus 1100 includes a CPU peripheral unit, an input/output unit and a legacy input/output unit. The CPU peripheral unit includes a multi-core processor 40, a system memory 20 and a graphics controller 1075, all of which are mutually connected to one another via a host controller 1082. The input/output unit includes a communication interface 1030, a hard disk drive 1040 and a CD-ROM drive 1060, all of which are connected to the host controller 1082 via an input/output controller 1084. The legacy input/output unit includes a ROM 1010, a flexible disk drive 1050 and an input/output chip 1070, all of which are connected to the input/output controller 1084.

The host controller 1082 mutually connects the system memory 20 to the multi-core processor 40 and the graphics controller 1075, both of which access the system memory 20 at a high transfer rate. The multi-core processor 40 is operated based on programs stored in the ROM 1010 and the system memory 20, and controls each of the components. The graphics controller 1075 obtains image data generated by the multi-core processor 40 or the like in a frame buffer provided in the system memory 20, and displays the obtained image data on a display device 1080. In place of this, the graphics controller 1075 may internally include a frame buffer in which the image data generated by the multi-core processor 40 or the like is stored.

The input/output controller 1084 connects the host controller 1082 to the communication interface 1030, the hard disk drive 1040 and the CD-ROM drive 1060, all of which are high-speed input/output devices. The communication interface 1030 communicates with an external device via a network. In the hard disk drive 1040, programs and data to be used by the information processing apparatus 1100 are stored. The CD-ROM drive 1060 reads a program or data from a CD-ROM 1095, and provides the read-out program or data to the system memory 20 or the hard disk 1040.

Moreover, the input/output controller 1084 is connected to relatively low-speed input/output devices such as the ROM 1010, the flexible disk drive 1050 and the input/output chip 1070. In the ROM 1010, stored are programs such as a boot program executed by the multi-core processor 40 at a start-up time of the information processing apparatus 1100 and a program or the like depending on hardware of the information processing apparatus 1100. The flexible disk drive 1050 reads a program or data from a flexible disk 1090, and provides the read-out program or data to the system memory 20 or the hard disk drive 1040 via the input/output chip 1070. The input/output chip 1070 is connected to the flexible disk 1090 and various kinds of input/output devices, for example, through a parallel port, a serial port, a keyboard port, a mouse port and the like.

A program to be provided to the information processing apparatus 1100 is provided by a user with the program stored in a storage medium such as the flexible disk 1090, the CD-ROM 1095 or an IC card. The program is read from the storage medium via the input/output chip 1070 and/or the input/output controller 1084, and is installed and executed on the information processing apparatus 1100. An operation that the program causes the information processing apparatus 1100 or the like to execute, is identical to the operation of the arithmetic system 10 described by referring to FIGS. 1 to 10. Accordingly, the description thereof is omitted here.

The program described above may be stored in an external storage medium. As the storage medium, any one of the following mediums may be used: an optical storing medium such as a DVD and a PD; a magneto-optic storing medium such as an MD; a tape medium; and a semiconductor memory such as an IC card, in addition to the flexible disk 1090 and the CD-ROM 1095. Alternatively, the program may be provided to the information processing apparatus 1100 via a network, by using, as a storage medium, a storage device such as a hard disk and a RAM, provided in a server system connected to a dedicated communication network or the internet.

As described above, the arithmetic system 10 according to the present embodiment and the modification example thereof stores chip vector data to be randomly accessed in a local memory within a microprocessor, and reads out matrix data whose access sequence has been known in advance in a streaming manner. Thereby, required data can be read out in the local memory before the start of an arithmetic operation, so that the arithmetic operation does not have to be interrupted for reading out of data. In addition, by operating multiple processing units in parallel, the speeds of arithmetic processes can be improved to a significant extent.

The present invention has been described by using the embodiment. However, the technical scope of the present invention is not limited to the above-described embodiment. It is obvious to those skilled in the art that various modifications and improvements may be made to the embodiment. For example, when the size of data of the vector 28 is so large that the data cannot be stored by use of two local memories 430, the vector 28 may be divided into equal to or more than three parts, and then each of the divided parts may be stored in local memories 430. Moreover, the value matrix 24 and the position matrix 26 are not limited to the ones shown in FIG. 2. For example, the value matrix 24 may be a matrix in which non-zero elements of the matrix 22 are arranged with columns, and the position matrix 26 may be a matrix in which information indicating the positions of rows of non-zero elements is arranged with columns. Moreover, it is also obvious from the scope of the present invention that such modification and improvement are included in the technical scope of the present invention.

While the invention has been particularly shown and described with reference to a preferred embodiment it will be understood by those skilled in the art that various changes in form and detail may be made therein without departing from the spirit and scope of the invention.

What is claimed is:

1. A data processing system includes a multi-core processor with a plurality of processing elements each having a processor and a local memory, said data processing system comprising:

a system memory for storing a value matrix in which non-zero elements of an input matrix are arranged, and a position matrix including elements each indicating positions of said non-zero elements of said input matrix;

a first processing element having a first local memory for storing a first sub-vector that is a part of said input vector;

a second processing element having a second local memory for storing a second sub-vector that is another part of said input vector;

a first readout unit configured to read out matrix elements sequentially one by one from said value matrix and from said position matrix stored in said system memory, and to store said read out matrix elements in said first local memory as newly-read matrix elements;

a first arithmetic unit in said first processing element configured to multiply two matrix elements every time a matrix element is read out by said first readout unit, wherein one of said two elements is a vector element in said first sub-vector that corresponds to the position of a non-zero element indicated by each of said matrix elements read out from said position matrix in said first local memory, and the other of said two elements is a non-zero element read out from said value matrix in said first local memory;

a second readout unit configured to read out a matrix element of said value matrix and said position matrix from said first local memory, and to store said matrix element in a second local memory as a newly-read matrix element every time an arithmetic operation is performed by said first arithmetic unit;

a second arithmetic unit in said second processing element configured to multiply two elements every time a matrix element is read by said second readout unit, wherein one of said two elements is a vector element in said second sub-vector that corresponds to a position of a non-zero element indicated by each of said matrix elements read from said position matrix in said second local memory, and the other of said two elements being a non-zero element read from said value matrix in said second local memory; and an output unit in said second processing unit configured to generate each element of a vector to indicate a product of said input matrix and said input vector based on results of said arithmetic operations performed by said first and second arithmetic units, and to store said element in said system memory.

2. The data processing system of claim 1, wherein each of said first and second local memories includes:
a first storage region for storing a read out matrix element;
a second storage region for storing a matrix element being used for an arithmetic operation; and
a third storage region for storing a matrix element that has already been used for an arithmetic operation.

3. The data processing system of claim 2, wherein said first readout unit reads out matrix elements sequentially one by one from said system memory and then stores a newly-read matrix element in said first storage region by replacing a matrix element previously stored in said first storage region with said newly-read matrix element.

4. The data processing system of claim 3, wherein said first arithmetic unit
reads out a matrix element from said first storage region and stores said matrix element in said second storage region;
performs an arithmetic operation by using said matrix element stored in said second storage region in parallel with a process in which the first readout unit reads another matrix element to said first storage region for the next arithmetic operation; and
reads out said matrix element from said second storage region and stores the read matrix element in a third storage region on condition of completion of said arithmetic operation.

5. The data processing system of claim 4, wherein said second readout unit, in parallel with the next arithmetic process performed by said first arithmetic unit, reads out a matrix element from said third storage region in said first local memory and stores said matrix element in said first region of said second local memory by replacing a matrix element previously stored in said first storage region.

6. The data processing system of claim 5, wherein said second arithmetic unit reads out a matrix element from said first storage region of said second local memory, and stores said matrix element in said second storage region, and performs an arithmetic operation by using said matrix element stored in said second storage region in parallel with a process in which said second readout unit reads a matrix element for the next arithmetic operation.

7. The data processing system of claim 6, wherein
said first arithmetic unit further calculates a total value of products of an element of said first sub-vector and each of said non-zero elements of said value matrix, and further stores said calculated total value in said third storage region,
said second readout unit further reads out said total value from said third storage region of said first local memory, and stores said total value in said first storage region by replacing a total value previously stored in said first storage region of said second local memory,
said second arithmetic unit reads out said total value stored in said first storage region of said second local memory, stores said read total value in said second storage region, calculates a total value of products of an element of said second sub-vector and each of said non-zero elements of said value matrix, adds said calculated total value to said total value stored in said second storage region, and then stores the resultant total value in said third storage region of said second local memory, and
said output unit reads out said total value from said third storage region of said second local memory and stores said total value as each element of a vector indicating said product of said input matrix and said input vector.

8. The data processing system of claim 1, wherein in parallel with an arithmetic operation in which said first arithmetic unit multiplies an element of said first sub-vector and another element of said value matrix, said second arithmetic unit performs an arithmetic operation of multiplying an element of said second sub-vector and another element of said value matrix.

9. The data processing system of claim 1, wherein said data processing system is configured to calculate a product obtained by multiplying an input matrix by an input vector from a right side of said matrix,
wherein said value matrix is a matrix formed by creating row vectors each having anon-zero element included in each of the rows of said input matrix, and by arranging said row vectors;
said position matrix is a matrix formed by creating row vectors each having elements indicating values of the positions of non-zero elements included in each of the rows of said input matrix, and by arranging said row vectors;
said multi-core processor includes a classification unit configured to scan the position matrix stored in said system memory, and to classify each of said rows of said input matrix into first to third categories, said first category indicating a row including a non-zero element to be multiplied by elements included in said first sub-vector and said second sub-vector, said second category indicating a row including a non-zero element to be multiplied by an element included in said first sub-vector, and said third category indicating a row including a non-zero element to be multiplied by an element in said second sub-vector;
said first readout unit sequentially reads out matrix elements of a predetermined number of rows among rows each corresponding to any one of said first and second categories, from each of said value matrix and said position matrix stored in said system memory;
said second readout unit reads out matrix elements of a row corresponding to said row of said first category in said matrix element and said position matrix from said first local memory, and further reads out matrix elements of a row corresponding to said row of said third category in said matrix element and said arrangement element stored in said system memory; and
said output unit generates each element of a vector indicating a product on said basis of said results of arithmetic operations performed by said first and second arithmetic units on said row of said first category, said result of an arithmetic operation performed by said first arithmetic unit on said row of said first category, and said result of an arithmetic operation performed by said second arithmetic unit on said row of said third category, and stores said generated element in said system memory.

10. A method for calculating a product of an input matrix and an input vector using a multi-core processor having a plurality of processing elements each having a processor and a local memory, said method comprising:

storing in a system memory a value matrix in which non-zero matrix elements of said input matrix are arranged, and a position matrix for indicating positions of said non-zero elements;

storing in a first local memory of a first one of said processing elements a first sub-vector that is a first part of said input vector;

storing in a second local memory of a second one of said processing elements a second sub-vector that is second part of said input vector;

sequentially reading out matrix elements from said value matrix and from said position matrix within said system memory, and storing said read out matrix elements in said first local memory as newly-read matrix elements;

multiplying two elements in said first processing element every time a matrix element is being read out, wherein one of said two elements is a vector element in said first sub-vector that corresponds to the position of a non-zero element indicated by each of said matrix elements read out from said position matrix in said first local memory, and the other of said two elements is a non-zero element read out from said value matrix in said first local memory;

reading out a matrix element of said value matrix and said position matrix from said first local memory and storing said matrix element in said second local memory as a newly-read matrix element every time said multiplying is being performed;

multiplying two elements in said second processing element every time a matrix element is being read out from said second local memory, wherein one of said two elements is a vector element in said second sub-vector that corresponds to the position of a non-zero element indicated by each of said matrix elements read from said position matrix in said second local memory, and the other of said two matrix elements being a non-zero element read from said value matrix in said second local memory; and generating each element of a vector indicating a product of said input matrix and said input vector based on results from said two multiplying operations.

* * * * *